No. 847,175. PATENTED MAR. 12, 1907.
P. J. GODFREY.
HANDLE FOR COFFEE OR TEA POTS.
APPLICATION FILED FEB. 26, 1906.
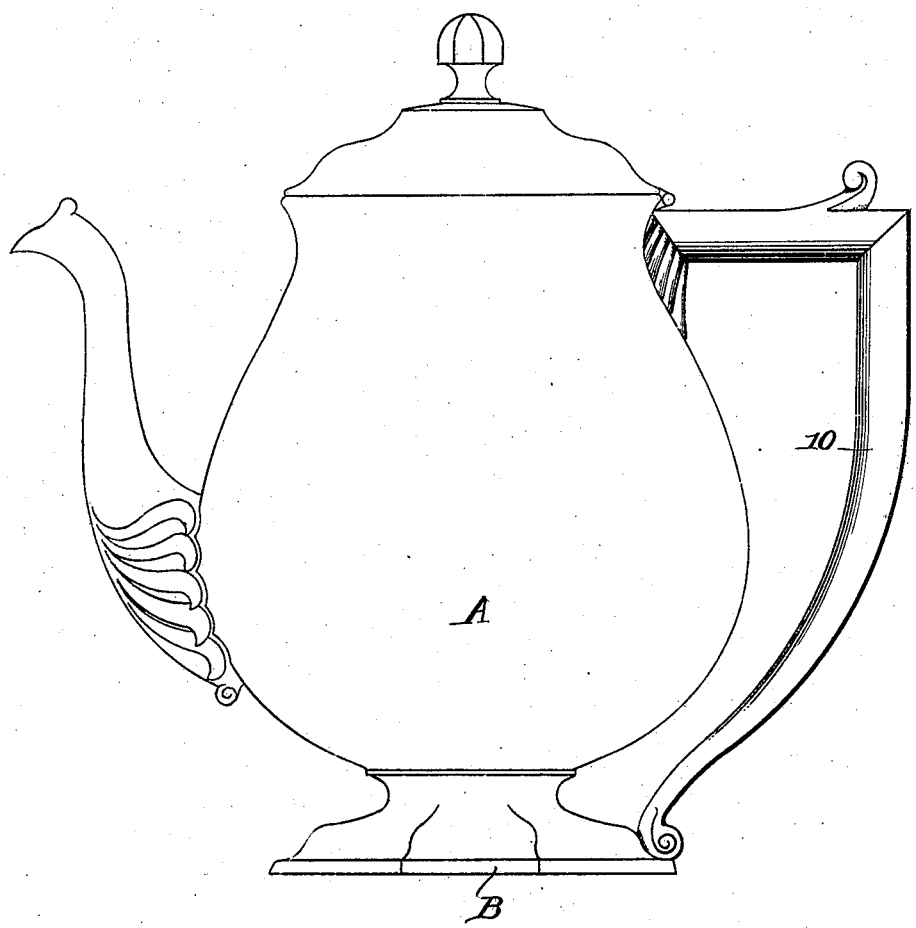
WITNESSES:
Philip J. Godfrey, INVENTOR.
By
ATTORNEYS

UNITED STATES PATENT OFFICE.

PHILIP JAMES GODFREY, OF TAUNTON, MASSACHUSETTS.

HANDLE FOR COFFEE OR TEA POTS.

No. 847,175.   Specification of Letters Patent.   Patented March 12, 1907.

Application filed February 26, 1906. Serial No. 303,023.

*To all whom it may concern:*

Be it known that I, PHILIP JAMES GODFREY, a citizen of the United States, residing at Taunton, in the county of Bristol and State of Massachusetts, have invented a new and useful Handle for Coffee or Tea Pots, of which the following is a specification.

This invention relates to the construction of teapots, coffee-pots, and other articles of tableware, and has for its principal object to provide a novel form of handle which is so connected to the article as to prevent danger of denting, bending, or mutilation from downward pressure on the handle and at the same time to preserve the contour of the bowl of the article with a view of adding to its attractiveness.

A further object of the invention is to provide a handle so constructed and connected to the article as to permit of more convenient handling, the attaching of the lower end of the handle to the base instead of to the bowl serving to maintain the handle at a comparatively low temperature, and at the same time the whole length of the handle may be spaced from the bowl, so that the teapot may be more conveniently handled in pouring.

With these and other objects in view, as will more fully hereinafter appear, the invention consists in certain novel features of construction and arrangement of parts, hereinafter fully described, illustrated in the accompanying drawings, and particularly pointed out in the appended claim, it being understood that various changes in the form, proportions, size, and minor details of the structure may be made without departing from the spirit or sacrificing any of the advantages of the invention.

The accompanying drawing illustrates in elevation a teapot or similar article constructed in accordance with the invention.

In the manufacture of teapots, coffee-pots, and similar articles in which hot beverages are served, especially articles made of britannia white metal, German silver, silver, or other metals, the handles are usually attached to the bowl, and where these articles are provided with base members, as is usual in table-service, downward pressure on the handle will often result in denting or bending of the pot or distortion or loosening of the handle, and at the same time the heat is readily conducted to the handle, and the latter is frequently at such a high temperature that it cannot conveniently be used.

A further and serious objection to articles of this class as ordinarily constructed is that where the attractiveness of the article resides in its general contour or outline the attaching of the handle to the bowl materially detracts from its appearance.

In the drawings, A represents the body portion of a teapot or similar article, B its base, and 10 the handle. The bowl and the base are of ordinary construction, and the handle being free from the lower portion of the bowl proper the outline of the latter is preserved.

The handle 10 is provided at its upper end with an arm that is attached at its inner end to the top of the bowl, while the body portion of the handle is continued down on a graceful curve following somewhat the contour of the bowl and is secured at its lower end to the base at a point near one end of the latter and in a position best calculated to stand downward pressure without injury.

The handle serves to reinforce and brace both the bowl and the base, and any downward pressure will be transmitted to the base and not to the bowl, while at the same time the heat of the contents of the vessel cannot be readily conducted to the handle, and the latter may therefore be used without inconvenience.

I claim—

A teapot or similar vessel having a supporting-base, and a bowl resting directly upon and connected to the base, a handle having its upper end secured to the upper portion of the bowl and its lower end secured to the base at a point near the extreme edge of the latter, the handle being spaced from the lower portion of the bowl.

In testimony that I claim the foregoing as my own I have hereto affixed my signature in the presence of two witnesses.

PHILIP JAMES GODFREY.

Witnesses:
 ANDREW MCGLYNN,
 PETER V. MCGLYNN.